ized as a

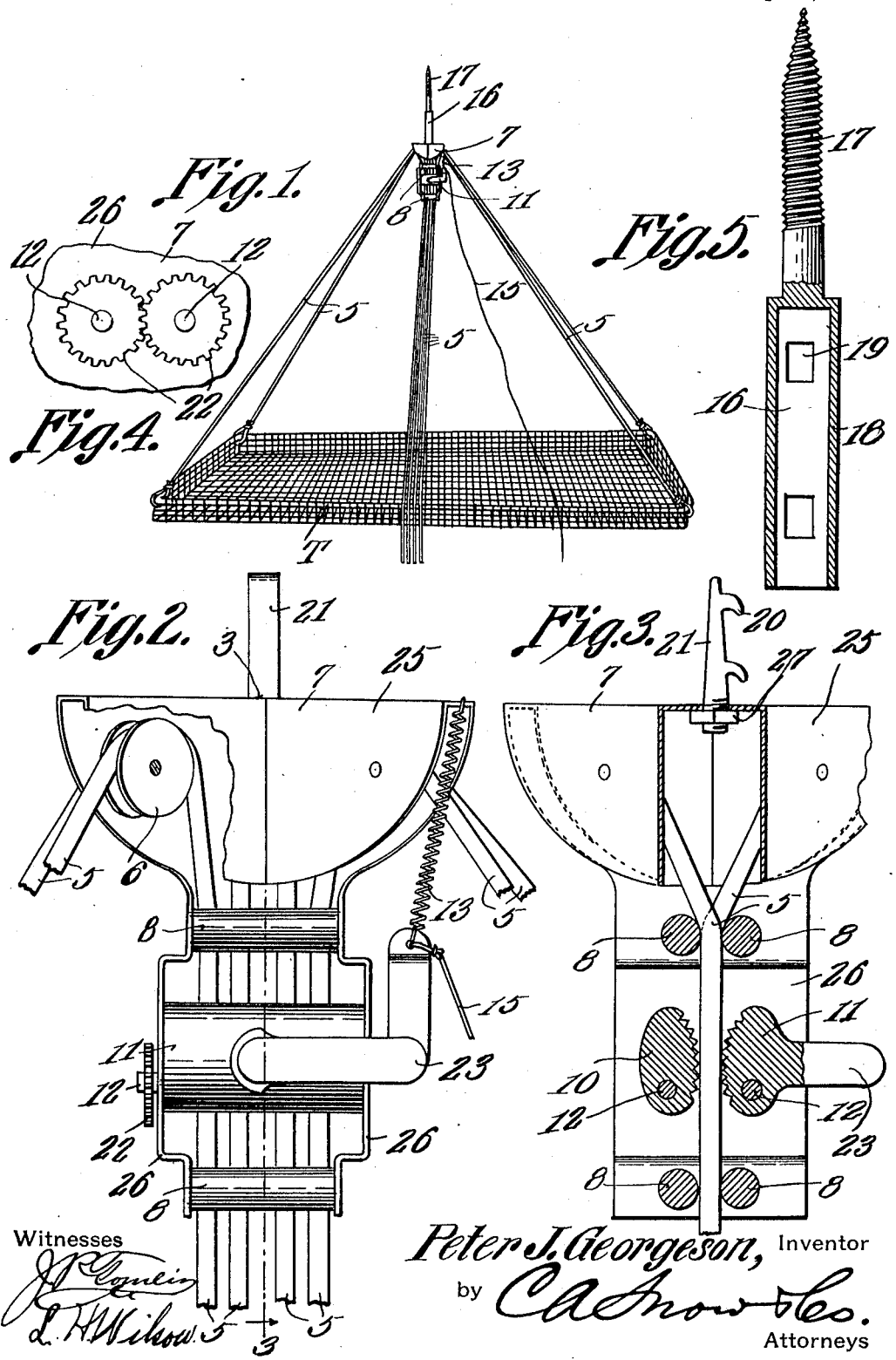

UNITED STATES PATENT OFFICE.

PETER J. GEORGESON, OF TUSTIN, WISCONSIN.

PULLEY-BLOCK.

1,022,411. Specification of Letters Patent. Patented Apr. 9, 1912.

Application filed May 6, 1911. Serial No. 625,658.

*To all whom it may concern:*

Be it known that I, PETER J. GEORGESON, a citizen of the United States, residing at Tustin, in the county of Waushara and State of Wisconsin, have invented a new and useful Pulley-Block, of which the following is a specification.

The device forming the subject matter of this application, is adapted to be employed for the elevation and transportation of bread and other articles, commonly handled in retail stores and elsewhere.

It is the object of the present invention to provide means whereby a suitable container, of any desired form, may be elevated and held at a predetermined height.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows the invention in perspective; Fig. 2 is a side elevation of the pulley and plant structure; Fig. 3 is a section on the line 3—3 of Fig. 2; Fig. 4 is a fragmental side elevation of the portion of the structure shown in Fig. 2; and Fig. 5 is a sectional elevation of a portion of the means whereby the device is connected with an overhead support.

The clamp and pulley structure appears most clearly in Figs. 2 and 3, and it will there be seen that this structure embraces a frame 7, consisting of four segmental, double-walled arms 25, certain of which are prolonged to form depending parallel extensions 26. Between the walls of the arms 25 of the frame, sheaves 6 are journaled for rotation. Journaled for rotation in the extensions 26, are shafts 12, secured to which are coöperating dogs 10 and 11, the dog 11 being provided with an angular arm 23, prolonged upon the outside of the extension 26 of the frame 7. The ends of the shafts 12 protrude through one of the extensions 26, the protruding ends of the shafts being equipped with intermeshing pinions 22. A retractile spring 13 is secured at its lower end to the arm 23 of the dog 11, the upper end of the spring 13 being secured to one of the arms 25 of the frame 7. To the arm 23 is attached a flexible member 15. Journaled for rotation in the extensions 26 of the frame, above and below the dogs 10 and 11, are pairs of oppositely disposed rollers 8.

The container is shown in the form of a rectangular wire basket or tray, denoted by the character T. To the four corners of the tray T, flexible elements 5 are secured. These flexible elements 5 are carried in converging relation toward the frame 7, the flexible elements being passed inwardly, between the walls of the arms 25, over the sheaves 6, and thence downwardly, in a common plane, between the upper rollers 8, between the dogs 10 and 11, and between the lower rollers 8, the free ends of the members 5 preferably extending, in close relation, across one edge of the tray T, as clearly shown in Fig. 1.

In connecting the frame 7 with an overhead support, a holder, denoted generally by the numeral 16 in Fig. 1, is provided. This holder 16 is equipped with a threaded, pointed end 17, merging into a cylindrical portion 18, having openings 19. In these openings 19 are adapted to register, removably, spaced studs 20, outstanding radially from a finger 21, secured by means of a nut 27, or in any other desired manner, to the upper end of the frame 7. The construction of the device, therefore, is such that the frame 7 may readily be disengaged from a holder 16, disposed in a given location, and be assembled with another holder 16, so that the tray T may be elevated at different points about a store or factory.

In practical operation, by drawing upon the flexible member 15, the dog 11 will be tilted, the intermeshing pinions 22 effecting a tilting of the dog 10, whereupon the grip of both dogs 10 and 11 upon the flexible members 5 will be released, it being then possible to pull downwardly upon the free ends of the members 5, whereupon the members 5 will pass over the sheaves 6, and between the rollers 8, elevating the tray T. As soon as the flexible member 15 is released, the spring 13 will elevate the arm 23 of the dog 11, the intermeshing pinions 22 causing both dogs 10 and 11 to grip automatically, the flexible members 5. Owing to the fact that oppositely positioned rollers 8 are provided, above and below the dogs 10 and 11, when the said dogs are released from the flexible members 5, it will be possible to draw the members 5 between the dogs 10 and 11, without friction between the flexible members and the dogs.

Having thus described the invention, what is claimed is:—

1. A device of the class described comprising a frame; shafts journaled for rotation therein; co-acting dogs secured to the shafts; intermeshing pinions upon the shafts; pairs of oppositely positioned rollers journaled for rotation in the frame, above and below the dogs; and a sheave journaled for rotation in the frame, above the uppermost pair of rollers.

2. A device of the class described comprising a frame; shafts journaled for rotation therein; co-acting dogs secured to the shafts; intermeshing pinions upon the shafts; pairs of oppositely positioned rollers journaled for rotation in the frame, above and below the dogs; a sheave journaled for rotation in the frame, above the uppermost pair of rollers; and spring means engaging one dog, to maintain the dogs normally in co-acting relation.

3. A device of the class described comprising a frame including radial, double-walled arms, certain of which are prolonged, to form depending extensions; sheaves journaled for rotation between the walls of the arms; co-acting dogs mounted in the extensions; and pairs of oppositely positioned rollers journaled for rotation in the extensions, above and below the dogs.

4. A device of the class described comprising a frame including radial, double-walled arms, certain of which are prolonged to form depending extensions; sheaves journaled for rotation between the walls of the arms; shafts journaled for rotation in the extensions; co-acting dogs secured to the shafts and located between the arms; intermeshing pinions secured to the shafts, upon the outside of one of the extensions; pairs of oppositely disposed rollers journaled for rotation in the extensions, above and below the dogs; one of the dogs being provided with an angularly disposed arm, prolonged upon the outside of one of the extensions; and a retractile spring connecting the last mentioned arm with the frame.

In testimony that I claim the foregoing as my own, I have hereto affixed my signature in the presence of two witnesses.

PETER J. GEORGESON.

Witnesses:
ARTHUR J. JORGENSEN,
BEN. A. BART, Jr.

Copies of this patent may be obtained for five cents each, by addressing the "Commissioner of Patents, Washington, D. C."